US011076373B2

(12) United States Patent
Tang

(10) Patent No.: US 11,076,373 B2
(45) Date of Patent: Jul. 27, 2021

(54) SYNCHRONISATION METHOD, TERMINAL AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 140 days.

(21) Appl. No.: 16/081,084

(22) PCT Filed: May 12, 2016

(86) PCT No.: PCT/CN2016/081862
§ 371 (c)(1),
(2) Date: Aug. 30, 2018

(87) PCT Pub. No.: WO2017/193333
PCT Pub. Date: Nov. 16, 2017

(65) Prior Publication Data
US 2019/0082409 A1 Mar. 14, 2019

(51) Int. Cl.
H04W 56/00 (2009.01)
H04W 4/70 (2018.01)
(Continued)

(52) U.S. Cl.
CPC .... H04W 56/0015 (2013.01); H04B 7/18517 (2013.01); H04W 4/70 (2018.02);
(Continued)

(58) Field of Classification Search
CPC ............... H04W 56/00; H04W 56/001; H04W 56/0015; H04W 4/70; H04W 56/0065;
(Continued)

(56) References Cited

U.S. PATENT DOCUMENTS 8,670,785 B2 * 3/2014 Nam ..................... H04W 64/00
455/456.2
10,149,121 B2 * 12/2018 Kim ......................... H04L 5/00
(Continued)

FOREIGN PATENT DOCUMENTS

CN 101656564 A 2/2010
CN 102571430 A 7/2012
(Continued)

OTHER PUBLICATIONS

Nokia et al: "D2D Synchronization—Out of network coverage/partial network cove", 3GPP Draft; R1-133496, 3rd Generation Partnership Project (3GPP), Mobile Competence Centre; 650, Route Des Lucioles; F-06921 Sophia-Antipolis Cedex; France, vol. RAN WG1 No. Barcelona, Spain; Aug. 19, 2013-Aug. 23, 2013 Aug. 10, 2013(Aug. 10, 2013), XP050716803.
(Continued)

Primary Examiner — Ayaz R Sheikh
Assistant Examiner — Louis Samara
(74) Attorney, Agent, or Firm — Ladas & Parry LLP

(57) ABSTRACT

Provided are a synchronisation method, a terminal device, a network device and a storage medium, capable of ensuring synchronisation between a terminal and a satellite system via D2D means. In the method, a network device determines that a first terminal cannot synchronise with a satellite system; the network device instructs a second terminal to send a satellite system-based synchronisation signal, used for the first terminal to synchronise with the satellite system via the synchronisation signal. In a possible implementation, the method may include that: the network equipment receives a first message sent by the first terminal, the first message indicating that the first terminal is not able to be synchronized with the satellite system and the first message
(Continued)

including information configured to acquire the present position of the first terminal.

14 Claims, 7 Drawing Sheets

(51) Int. Cl.
*H04B 7/185* (2006.01)
*G01S 19/52* (2010.01)

(52) U.S. Cl.
CPC ... *H04W 56/0065* (2013.01); *H04W 56/0095* (2013.01); *G01S 19/52* (2013.01)

(58) Field of Classification Search
CPC ........... H04W 56/0095; H04W 56/002; H04W 40/22; H04W 8/005; H04W 4/27; H04W 48/16; H04B 7/18517; H04B 7/15507; H04H 20/08
See application file for complete search history.

(56) References Cited

U.S. PATENT DOCUMENTS

| | | | |
|---|---|---|---|
| 2009/0196277 A1 | 8/2009 | Horn | |
| 2011/0312345 A1* | 12/2011 | Nam | H04W 64/00 455/456.2 |
| 2014/0162687 A1* | 6/2014 | Edge | H04H 20/08 455/456.1 |
| 2014/0171062 A1* | 6/2014 | Fallgren | H04W 40/22 455/422.1 |
| 2015/0097731 A1 | 4/2015 | Russell | |
| 2015/0181546 A1 | 6/2015 | Freda et al. | |
| 2015/0264588 A1* | 9/2015 | Li | H04W 56/002 370/350 |
| 2015/0327195 A1* | 11/2015 | Chiu | H04B 7/15507 370/350 |
| 2016/0095074 A1* | 3/2016 | Park | H04W 56/001 370/350 |
| 2017/0048797 A1* | 2/2017 | Choi | H04W 4/027 |
| 2017/0150330 A1* | 5/2017 | Kim | H04W 48/16 |

FOREIGN PATENT DOCUMENTS

| | | |
|---|---|---|
| CN | 103108389 A | 5/2013 |
| CN | 103109572 A | 5/2013 |
| CN | 103647832 A | 3/2014 |
| CN | 104736770 A | 6/2015 |
| CN | 104754740 A | 7/2015 |
| CN | 104768217 A | 7/2015 |
| EP | 2950460 A2 | 12/2015 |
| WO | 2014182342 A1 | 11/2014 |
| WO | 2015066524 A1 | 5/2015 |

OTHER PUBLICATIONS

Supplementary European Search Report in European application No. 16901288.7, dated Dec. 7, 2018.
English Translation of the Written Opinion of the International Search Authority in international application No. PCT/CN2016/081662, dated Jan. 26, 2017.
Panasonic:"Discussion on V2V synchronization remaining issues", 3GPP Draft; R1-162805, 3rd Generation Partnership Project (3GPP), Mobile Competence Center; 650, Route Des Lucioles; F-06921 Sophia-Antipolis Cedex; France, vol. RAN WG1, No. Busan, Korea; Apr. 11, 2016-Apr. 15, 2016 Apr. 1, 2016, XP051079696.
First Office Action of European application No. 16901288.7, dated Nov. 18, 2019.
International Search Report in international application No. PCT/CN2016/081862; dated Jan. 26, 2017.
Written Opinion of the Internattonal Search Authority in international application No. PCT/CN2016/081862, dated Jan. 26, 2017.
CATT: "Synchronization enhancement in PC5-based V2V" 3GPP Draft; R1-155225, 3rd Generation Partnershp Project (3GPP), vol. RAN WG1, No. Malmö, Sweden; 2015100520151009 Oct. 4, 2015, XP051039602.
Samsung: "On D2D communication related to out-of-coverage UE with TX timing not from eNB ", 3GPP Draft: 2 R1-143856, D2D Preconfigured, Resource for OOC, 3rd Generation Partnership Project (3GPP), vol. RAN WG1, No. Ljubljana, Slovenia: Oct. 6, 2014-Oct. 10, 2014 Oct. 5, 2014, XP050875171.
First Office Action of the Indian application No. 201817037598, dated Jun. 12, 2020.
Second Office Action of the European application No. 16901288.7, dated Jul. 6, 2020.
First Office Action in corresponding Japanese application No. 2018-548684, dated Jan. 31, 2020.
CATT "Synchronization enhancements PC5-based V2V" 3GPP TSG RAN WG1 Meeting #84 R1-160360, St Julian's, Malta, Feb. 15-19, 2016.
Second Office Action of the Japanese application No. 2018-548684, dated Oct. 6, 2020.
First Office Action of the Chinese application No. 201680082577.9, dated Nov. 4, 2020.
First Office Action of the Taiwanese application No. 106115371, dated Dec. 24, 2020.
Second Office Action of the Chinese application No. 201680082577.9, dated Jun. 10, 2021.

* cited by examiner

SYNCHRONISATION METHOD, TERMINAL AND NETWORK DEVICE

RELATED APPLICATION

This application is an application under 35 U.S.C. 371 of International Application No. PCT/CN2016/081862 filed on 12 May 2016, the entire contents of which are incorporated herein by reference.

TECHNICAL FIELD

The application relates to the field of communication, and more particularly to a synchronization method, a terminal and a network equipment.

BACKGROUND

In a related cellular communication system, signaling and data interaction between terminals requires respective serving base stations and a core network for forwarding.

A Device to Device (D2D) technology is a direct communication technology. Data interaction between terminals requires no base station for forwarding. A D2D link may be established between the terminals for direct interaction or direct interaction under assistance of a network.

In 3rd Generation Partnership Project (3GPP) Release-12&13, a terminal implements synchronization for D2D communication by use of synchronization of a cellular network.

With introduction of a satellite system into D2D communication, how to implement synchronization becomes a problem urgent to be solved.

SUMMARY

Embodiments of the present disclosure provide a synchronization method, terminal equipment, network equipment and a storage medium, which may ensure synchronization between a terminal and a satellite system in a D2D manner.

A first aspect provides a synchronization method, which may include that: a network equipment determines that a first terminal is not able to be synchronized with a satellite system; and the network equipment indicates a second terminal to send a satellite-system-based synchronization signal by which the first terminal is synchronized with the satellite system.

Therefore, in the embodiments of the present disclosure, when the first terminal is not able to be synchronized with the satellite system, the network equipment may indicate the second terminal to send a satellite-system-based synchronization message configured to synchronize the first terminal and the satellite system, so that synchronization between the terminal and the satellite system may be ensured in a D2D manner.

In combination with the first aspect, in a first possible implementation of the first aspect, before the operation that the network equipment indicates the second terminal to send the satellite-system-based synchronization signal, the method may further include that: the network equipment determines a present position of the first terminal; and the network equipment selects the second terminal according to the present position of the first terminal.

In combination with the first aspect or any abovementioned possible implementation thereof, in a second possible implementation of the first aspect, the method may include that: the network equipment receives a first message sent by the first terminal, the first message indicating that the first terminal is not able to be synchronized with the satellite system and the first message including information configured to acquire the present position of the first terminal.

The operation that the network equipment determines that the first terminal is not able to be synchronized with the satellite system may include that: the network equipment determines that the first terminal is not able to be synchronized with the satellite system according to the first message.

The operation that the network equipment determines the present position of the first terminal may include that: the present position of the first terminal is determined according to the first message.

In combination with the first aspect or any abovementioned possible implementation thereof, in a third possible implementation of the first aspect, the method may include that: the network equipment receives a report message sent by the second terminal or a third terminal, the report message indicating that the first terminal is not able to be synchronized with the satellite system and including the information from which the present position of the first terminal is acquired.

The operation that the network equipment determines that the first terminal is not able to be synchronized with the satellite system may include that: the network equipment determines that the first terminal is not able to be synchronized with the satellite system according to the report message.

The operation that the network equipment determines the present position of the first terminal may include that: the present position of the first terminal is determined according to the report message.

In combination with the first aspect or any abovementioned possible implementation thereof, in a fourth possible implementation of the first aspect, the report message may further include information of a present position of the terminal and information of a strength of a satellite signal detected by the terminal of the second message.

In combination with the first aspect or any abovementioned possible implementation thereof, in a fifth possible implementation of the first aspect, the information from which the present position of the first terminal is acquired may include position information of the first terminal which is acquired by the first terminal from the satellite system at a first time and velocity information representing velocity of the first terminal from the first time to a time when the first message is reported.

In combination with the first aspect or any abovementioned possible implementation thereof, in a sixth possible implementation of the first aspect, before the operation that the network equipment selects the second terminal according to the present position of the first terminal, the method may further include that: the network equipment receives a second message sent by each of multiple terminals, the second message indicating information of a present position of the terminal and information of a strength of a satellite signal detected by the terminal.

The operation that the network equipment selects the second terminal according to the present position of the first terminal may include that: the second terminal is selected according to the present position of the first terminal and information of the present position of each of the multiple terminals and the strength of the satellite signal detected by each of the multiple terminals.

In combination with the first aspect or any abovementioned possible implementation thereof, in a seventh possible implementation of the first aspect, before the operation that the network equipment receives the second message sent by each of the multiple terminals, the method may further include that: the network equipment sends a broadcast message to terminals within a first region, the broadcast message indicating each of the terminals within the first region to report information of a present position of the terminal and information of a strength of a satellite signal detected by the terminal, wherein a distance between a position in the first region and the present position of the first terminal may be shorter than or equal to a first predetermined distance.

In combination with the first aspect or any abovementioned possible implementation thereof, in an eighth possible implementation of the first aspect, the operation that the network equipment receives the second message sent by each of the multiple terminals may include that: the second message regularly sent by each of the multiple terminals are received.

In combination with the first aspect or any abovementioned possible implementation thereof, in a ninth possible implementation of the first aspect, the operation that the network equipment indicates the second terminal to send the satellite-system-based synchronization signal may include that: the second terminal is indicated through a broadcast channel to send the satellite-system-based synchronization signal, wherein the second terminal may be a terminal of which detected satellite signal strength is more than or equal to a strength threshold in a second region, and a distance between a position in the second region and the present distance of the terminal may be shorter than or equal to a second predetermined distance.

A second aspect provides a synchronization method, which may include that: network equipment generates an indication message, the indication message indicating a second terminal within a first region to send a satellite-system-based synchronization signal or a terminal to send, once the terminal enters the first region, a satellite-system-based synchronization signal; and the network equipment sends the indication message.

Therefore, in the embodiments of the present disclosure, the network equipment may indicate the terminal in the first region or entering the first region to send the satellite-system-based synchronization signal, so that synchronization between a terminal in a neighboring region of the first region and a satellite system may be ensured.

In combination with the second aspect, in a first possible implementation of the second aspect, before the operation that the network equipment generates the indication message, the method may further include that: the network equipment determines that satellite signal strength of a second region is equal to or less than a strength threshold, wherein the first region may be a neighboring region of the second region, and a distance between a position in the first region and a position in the second region may be shorter than or equal to a first predetermined distance; and the first region is determined according to position information of the second region.

In combination with the second aspect or any abovementioned possible implementation thereof, in a second possible implementation of the second aspect, the method may further include that: the network equipment receives a first report message sent by a terminal within the second region, the report message indicating a strength of a satellite signal detected by the terminal; and the satellite signal strength of the second region is determined according to the strength of the satellite signal detected by the terminal within the second region.

In combination with the second aspect or any abovementioned possible implementation thereof, in a third possible implementation of the second aspect, before the operation that the network equipment generates the indication message, the method may further include that: the network equipment sends a first broadcast message to terminals within the first region, the first broadcast message indicating each of the terminals within the first region to report information of a satellite signal detected by the terminal; the network equipment receives a second report message sent by each of the terminals within the first region, the second report message indicating the information of the strength the satellite signal detected by the terminal; and the network equipment selects the second terminal from the terminals within the first region according to the information of the strength of the satellite signal detected by the terminals within the first region.

In combination with the second aspect or any abovementioned possible implementation thereof, in a fourth possible implementation of the second aspect, the second terminal in the first region may be a terminal which detects a satellite signal having a strength higher than a predetermined strength; and the operation that the network equipment sends the indication message may include that: the network equipment sends the indication message through a broadcast channel to indicate the terminal which is located within the first region and which detects a satellite signal having a strength higher than the predetermined strength to send the satellite-system-based synchronization signal.

A third aspect provides a synchronization method, which may include that: it is determined that a first terminal is not able to be synchronized with a satellite system; the first terminal sends a first message, the first message indicating that the first terminal is not able to be synchronized with the satellite system; the first terminal receives a satellite-system-based synchronization signal sent by a second terminal; and the first terminal is synchronized with the satellite system according to the synchronization signal.

In combination with the third aspect, in a first possible implementation of the third aspect, the first message may include information from which a present position of the first terminal is acquired.

In combination with the third aspect or any abovementioned possible implementation thereof, in a second possible implementation of the third aspect, the information from which the present position of the first terminal is acquired may include position information of the first terminal which is acquired by the first terminal from the satellite system at a first time and velocity information representing velocity of the first terminal from the first time to a time when the first message is reported.

In combination with the third aspect or any abovementioned possible implementation thereof, in a third possible implementation of the third aspect, the operation that the first terminal sends the first message may include that:

the first terminal sends the first message to a network equipment.

In combination with the third aspect or any abovementioned possible implementation thereof, in a fourth possible implementation of the third aspect, the operation that the first terminal sends the first message may include that: the first terminal broadcasts the first message to terminals.

In combination with the third aspect or any abovementioned possible implementation thereof, in a fifth possible implementation of the third aspect, the first message may be a synchronization signal generated by the first terminal.

In combination with the third aspect or any abovementioned possible implementation thereof, in a sixth possible implementation of the third aspect, it may be determined that the first terminal is not able to be synchronized with the satellite system under conditions that: a strength of a satellite signal detected by the first terminal within a first predetermined time period is equal to or less than a first strength threshold; or the strength of the satellite signal detected by the first terminal within the first predetermined time period is equal to or less than the first strength threshold and strength of a satellite-system-based synchronization signal detected by the first terminal within a second predetermined time period and sent by a terminal directly synchronized with the satellite system is equal to or less than a second strength threshold; or the strength of the satellite signal detected by the first terminal within the first predetermined time period is equal to or less than the first strength threshold, the strength of the satellite-system-based synchronization signal detected by the first terminal within the second predetermined time period and sent by the terminal directly synchronized with the satellite system is equal to or less than the second strength threshold and strength of a satellite-system-based synchronization signal detected by the first terminal within a third predetermined time period and sent by a terminal indirectly synchronized with the satellite system is equal to or less than a third strength threshold.

A fourth aspect provides a synchronization method, which may include that: a second terminal receives an indication message, the indication message indicating the second terminal to send a satellite-system-based synchronization signal; and the second terminal sends the satellite-system-based synchronization signal according to the indication message such that a first terminal is synchronized with a satellite system through the synchronization signal.

In combination with the fourth aspect, in a first possible implementation of the fourth aspect, the operation that the second terminal receives the indication message may include that: the second terminal receives the indication message sent by the first terminal.

In combination with the fourth aspect or any abovementioned possible implementation thereof, in a second possible implementation of the fourth aspect, the operation that the second terminal sends the satellite-system-based synchronization signal may include that: when satellite signal strength detected by the second terminal is more than or equal to a strength threshold, the second terminal sends the satellite-system-based synchronization signal.

In combination with the fourth aspect or any abovementioned possible implementation thereof, in a third possible implementation of the fourth aspect, the operation that the second terminal receives the indication message may include that: the second terminal receives the indication message sent by a network equipment.

In combination with the fourth aspect or any abovementioned possible implementation thereof, in a fourth possible implementation of the fourth aspect, before the operation that the second terminal receives the indication message sent by the network equipment, the method may further include that: the second terminal reports information of a present position of the second terminal and information of a satellite signal detected by the second terminal to the network equipment.

In combination with the fourth aspect or any abovementioned possible implementation thereof, in a fifth possible implementation of the fourth aspect, before the operation that the second terminal reports the information of a present position of the second terminal and information of a satellite signal detected by the second terminal to the network equipment, the method may further include that: the second terminal receives a broadcast message sent by the network equipment, the broadcast message being configured to request a terminal having received the broadcast message to report information of a present position of the terminal and information of a strength of a satellite signal detected by the terminal.

In combination with the fourth aspect or any abovementioned possible implementation thereof, in a sixth possible implementation of the fourth aspect, before the operation that the second terminal reports the information of a present position of the second terminal and information of a satellite signal detected by the second terminal to the network equipment, the method may further include that: the second terminal receives an assistance request message sent by the first terminal, the assistance request message indicating that the first terminal is not able to be synchronized with the satellite system and the first message containing information from which a position of the first terminal is acquired.

The operation that the second terminal reports the information of a present position of the second terminal and information of a satellite signal detected by the second terminal to the network equipment may include that: the second terminal reports the information of a present position of the second terminal and information of a satellite signal detected by the second terminal to the network equipment according to the assistance request message; and the method may further include that: the second terminal sends the information from which the position of the first terminal is acquired to the network equipment.

In combination with the fourth aspect or any abovementioned possible implementation thereof, in a seventh possible implementation of the fourth aspect, the operation that the second terminal reports the information of a present position of the second terminal and information of a satellite signal detected by the second terminal to the network equipment may include that: the second terminal regularly reports the information of a present position of the second terminal and information of a satellite signal detected by the second terminal to the network equipment.

In combination with the fourth aspect or any abovementioned possible implementation thereof, in an eighth possible implementation of the fourth aspect, the operation that the second terminal reports the information of a present position of the second terminal and information of a satellite signal detected by the second terminal to the network equipment may include that: when a movement velocity of the second terminal is higher than a predetermined velocity or a movement distance of the second terminal is longer than a predetermined distance, the second terminal reports the information of a present position of the second terminal and information of a satellite signal detected by the second terminal to the network equipment.

In combination with the fourth aspect or any abovementioned possible implementation thereof, in a ninth possible implementation of the fourth aspect, the synchronization signal may further be configured to indicate that the second terminal is directly synchronized with the satellite system or indirectly synchronized with the satellite system; or the method may further include that: the second terminal sends a synchronization broadcast channel, the synchronization broadcast channel indicating that the second terminal is directly synchronized with the satellite system or indirectly synchronized with the satellite system.

A fifth aspect provides a network equipment, which is configured to execute the method in the first aspect or any possible implementation of the first aspect. Specifically, the network equipment includes units configured to execute the method in the first aspect or any possible implementation of the first aspect.

A sixth aspect provides a network equipment, which is configured to execute the method in the second aspect or any possible implementation of the second aspect.

Specifically, the network equipment includes units configured to execute the method in the second aspect or any possible implementation of the second aspect.

A seventh aspect provides a terminal equipment, which is configured to execute the method in the third aspect or any possible implementation of the third aspect. Specifically, the terminal equipment includes units configured to execute the method in the third aspect or any possible implementation of the third aspect.

An eighth aspect provides a terminal equipment, which is configured to execute the method in the fourth aspect or any possible implementation of the fourth aspect.

Specifically, the terminal equipment includes units configured to execute the method in the fourth aspect or any possible implementation of the fourth aspect.

A ninth aspect provides a network equipment, which includes a memory and a processor, wherein the memory is configured to store an instruction, the processor is configured to execute the instruction stored in the memory, and when the processor executes the instruction stored in the memory, such execution enables the processor to execute the method in the first aspect or any possible implementation of the first aspect.

A tenth aspect provides a network equipment, which includes a memory and a processor, wherein the memory is configured to store an instruction, the processor is configured to execute the instruction stored in the memory, and when the processor executes the instruction stored in the memory, such execution enables the processor to execute the method in the second aspect or any possible implementation of the second aspect.

An eleventh aspect provides a terminal equipment, which includes a memory and a processor, wherein the memory is configured to store an instruction, the processor is configured to execute the instruction stored in the memory, and when the processor executes the instruction stored in the memory, such execution enables the processor to execute the method in the third aspect or any possible implementation of the third aspect.

A twelfth aspect provides a terminal equipment, which includes a memory and a processor, wherein the memory is configured to store an instruction, the processor is configured to execute the instruction stored in the memory, and when the processor executes the instruction stored in the memory, such execution enables the processor to execute the method in the fourth aspect or any possible implementation of the fourth aspect.

A thirteenth aspect provides a computer storage medium having stored thereon program codes causing the method in the first aspect or any possible implementation of the first aspect to be executed.

A fourteenth aspect provides a computer storage medium having stored thereon program codes causing the method in the second aspect or any possible implementation of the second aspect to be executed.

A fifteenth aspect provides a computer storage medium having stored thereon program codes causing the method in the third aspect or any possible implementation of the third aspect to be executed.

A sixteenth aspect provides a computer storage medium having stored thereon program codes causing the method in the fourth aspect or any possible implementation of the fourth aspect to be executed.

BRIEF DESCRIPTION OF DRAWINGS

In order to describe the technical solutions of the embodiments of the present disclosure more clearly, the drawings required to be used in descriptions about the embodiments or a related art will be simply introduced below. It is apparent that the drawings described below are only some embodiments of the present disclosure. Other drawings may further be obtained by those of ordinary skilled in the art according to these drawings without creative work.

DETAILED DESCRIPTION

Figure 1:
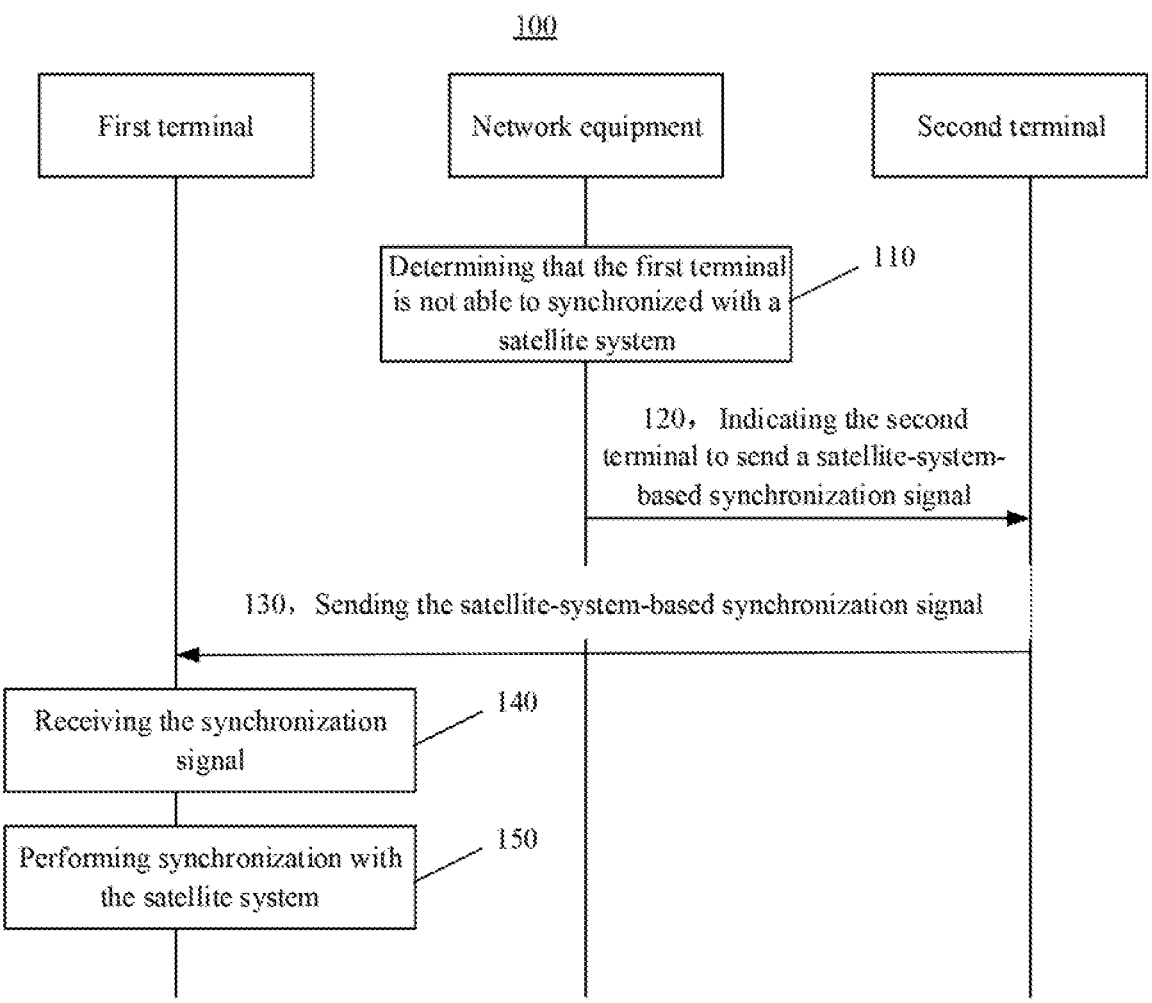
FIG. 1 is a schematic flowchart of a communication method according to an embodiment of the present disclosure.

The technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skilled in the art on the basis of the embodiments in the present disclosure without creative work shall fall within the scope of protection of the present disclosure.

It is to be understood that the technical solutions of the present disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS) and 5th-Generation (5G).

In some embodiments, D2D communication may refer to Vehicle to Vehicle (V2V) communication or Vehicle to X (V2X) communication. In V2X communication, X may generally refer to any equipment with a wireless receiving and sending capability, for example, but not limited to, a wireless device moving at a low speed, vehicle-mounted equipment moving at a high speed or a network control node with a wireless transmitting and receiving capability. Of course, the embodiments of the present disclosure may be applied to not D2D communication but communication between a terminal and a cellular network.

In the embodiments of the present disclosure, network equipment may be a Base Transceiver Station (BTS) in the GSM or CDMA, may also be a NodeB in WCDMA, may also be an Evolved Node B (eNB or e-NodeB) in LTE, and may further be equipment configured to provide access service in 5G. There are no limits made in the embodiments of the present disclosure.

In the embodiments of the present disclosure, a terminal for which a satellite-system-based synchronization signal is required to be provided is called a first terminal, a terminal providing the satellite-system-based synchronization signal is called a second terminal, and this is only for convenient description and does not represent that the first terminal has no function of providing a satellite-system-based synchronization signal (for example, the first terminal moves to a region where a satellite signal may be detected) and represent that no satellite-system-based synchronization signal is required to be provided for the second terminal (for example, the second terminal moves to a region where no synchronization signal directly from a satellite system and no satellite-system-based synchronization signal may be detected), that is, the first terminal may have a function of the second terminal and the second terminal may also have a function of the first terminal.

In the embodiments of the present disclosure, a first region, a second region, a third region and the like may be the same region or different regions. First regions mentioned in different embodiments may be the same region or different regions, which should be determined according to a specific condition. Similarly, other messages, for example, a first message and an assistance request message, may be the same message sometimes and are distinguished in terms of names for convenient description.

In the embodiments of the present disclosure, the satellite system may be a Global Navigation Satellite System (GNSS).

FIG. 1 is a schematic flowchart of a synchronization method 100 according to an embodiment of the present disclosure. As illustrated in FIG. 1, the method 100 includes 110, 120, 130, 140 and 150.

In 110, a network equipment determines that a first terminal is not able to be synchronized with a satellite system.

Optionally, the network equipment may determine that the first terminal is not able to be synchronized with the satellite system in at least the following two manners.

In an implementation, the first terminal determines that the first terminal may not be synchronized with the satellite, the first terminal sends a first message to the network equipment. The first message indicates that the first terminal is not able to be synchronized with the satellite system. Then the network equipment may determine that the first terminal is not able to be synchronized with the satellite system according to the first message.

It is to be understood that, when the first terminal is in an idle state, if it is determined that the first terminal is not able to be synchronized with the satellite system, the first terminal may enter a connected state from the idle state at first and then send the first message to the network equipment.

In another implementation, the first terminal determines that the first terminal is not able to be synchronized with the satellite system, the first terminal broadcasts the first message to terminals. The first message indicates that the first terminal is not able to be synchronized with the satellite system. The terminal, after detecting the first message, may send a report message to the network equipment. The report message indicates that the first terminal is not able to be synchronized with the satellite system. Then the network equipment may determine that the first terminal is not able to be synchronized with the satellite system according to the report message. In the implementation, the first message may optionally be a synchronization signal generated by the first terminal.

In the embodiment of the present disclosure, for synchronization signals related to the satellite system, the priorities may be defined as:

a satellite signal>a synchronization signal from a terminal directly synchronized with the satellite system>a synchronization signal from a terminal indirectly synchronized with the satellite system>a synchronization signal generated by a terminal.

Optionally, it is determined that the first terminal is not able to be synchronized with the satellite system under conditions that:

a strength of a satellite signal detected by the first terminal within a first predetermined time period is equal to or less than a first strength threshold; or the strength of the satellite signal detected by the first terminal within the first predetermined time period is equal to or less than the first strength threshold and strength of a satellite-system-based synchronization signal detected by the first terminal within a second predetermined time period and sent by a terminal directly synchronized with the satellite system is equal to or less than a second strength threshold; or the strength of the satellite signal detected by the first terminal within the first predetermined time period is equal to or less than the first strength threshold, the strength of the satellite-system-based synchronization signal detected by the first terminal within the second predetermined time period and sent by the terminal directly synchronized with the satellite system is equal to or less than the second strength threshold and strength of a satellite-system-based synchronization signal detected by the first terminal within a third predetermined time period and sent by a terminal indirectly synchronized with the satellite system is equal to or less than a third strength threshold.

It is to be understood that the first predetermined time period, the second predetermined time period and the third predetermined time period may be time periods with the same length; or the first predetermined time period, the second predetermined time period and the third predetermined time period are time periods with the same length as well as the same starting point and ending point; or the first predetermined time period is after the second predetermined time period, the second predetermined time period is after the third predetermined time period, the first predetermined time period is connected with the second predetermined time period, and the second predetermined time period is connected with the third predetermined time period.

It is also to be understood that the first strength threshold, the second strength threshold and the third strength threshold may be determined according to a practical condition. For example, the first strength threshold, the second strength threshold and the third strength threshold may directly be set to be 0.

In 120, the network equipment indicates a second terminal to send a satellite-system-based synchronization signal by which the first terminal is synchronized with the satellite system.

Optionally, the network equipment determines a present position of the first terminal; and the network equipment selects the second terminal according to the present position of the first terminal.

Optionally, the first message sent by the first terminal may also contain information configured to acquire the present position of the first terminal.

When the first terminal sends the first message to the network equipment, the network equipment may determine the present position of the first terminal according to the information from which the present position of the first terminal is acquired in the first message.

When the first terminal broadcasts the first message to the terminal, the terminal receiving the first message, when sending the report message configured to indicate that the first terminal is not able to be synchronized with the satellite system to the network equipment, may report the information from which the present position of the first terminal is acquired to the network equipment. Optionally, the terminal receiving the first message may also contain its own present position information and detected satellite signal strength information in the report message.

Optionally, the information from which the present position of the first terminal is acquired may include position information of the first terminal which is acquired by the first terminal from the satellite system at a first time and velocity information representing velocity of the first terminal from the first time to a time when the first message is reported.

Here, when the terminal determines that average satellite signal strength detected within a certain time period is equal to or less than a predetermined threshold and is required to send the first message, the position information acquired at the first moment through the satellite system and the velocity information from the first moment to the first message reporting moment may be determined. The first moment may be determined in a manner that a last detection moment when the terminal may obtain positioning information through the satellite system before sending the first message is determined as the first moment. Alternatively, a last detection moment when the positioning information may be obtained through the satellite system within the time period may be determined as the first moment. Of course, the first moment may also be another moment. There are no limits made in the present disclosure.

Here, the velocity information may include a velocity at the first moment and a velocity at a first message sending moment. Alternatively the velocity information may include an average velocity from the first moment to the first message sending moment. The velocity mentioned in the present disclosure is a vector and includes an absolute velocity and a direction.

Optionally, the network equipment may select the second terminal according to the present position of the first terminal and present position information and detected satellite signal strength information of multiple terminals. For example, N terminals of which detected signal strength is higher than a fixed value and which is closest to the first terminal may be determined as second terminals.

Here, the network equipment may receive second messages sent by the multiple terminals. The second messages includes the present position information and detected satellite system strength information of the senders. The network equipment may determine a present position and detected satellite system strength of each terminal through the second messages.

Optionally, the terminal may be triggered by an event to send the second message.

For example, the second message sent by the terminal may be sent after receiving the first message sent by the first terminal. That is, the second message may be the above-mentioned report message. The second message not only includes the present position information and detected satellite signal strength information of the terminal, but also indicates that the first terminal is not able to be synchronized with the satellite system and includes the information from which the present position of the first terminal is acquired.

For another example, the terminal may send the second message to the network equipment when determining that its own movement distance exceeds a certain distance (compared with a position where its own present position information and detected satellite signal strength information are reported last time, the movement distance exceeds a certain distance) and a movement velocity exceeds a certain threshold.

For another example, the terminal may send the second message to the network equipment after detected satellite signal strength is more than or equal to a certain threshold.

Optionally, the terminal may regularly send the second message to the network equipment.

Optionally, the network equipment, before receiving the second messages sent by the multiple terminals and after determining present position information of the first terminal (for example, determining the present position information of the first terminal through the first message sent by the first terminal), may send a broadcast message to terminals in a first region. The broadcast message indicates the terminals within the first region to report present position information and detected satellite signal strength information. Here, a distance between a position in the first region and the present position of the terminal is shorter than or equal to a predetermined distance. Then, the terminals receiving the broadcast message may send the second messages to the network equipment, including their own present position information and detected synchronization signal strength information of the satellite system.

For example, if the network equipment may not receive a second message regularly sent by a terminal in the connected state, the broadcast message may be sent to a terminal in the idle state. The terminal in the idle state, after receiving the broadcast message, may be converted from the idle state to the connected state at first and then send the second message to the network equipment. Of course, the present disclosure is not limited. For example, a terminal in the connected state does not regularly send the second message to the terminal, and instead, waits for the broadcast message sent by the network equipment and then sends the second message.

Optionally, in the embodiment of the present disclosure, the network equipment, after determining that the first terminal is not able to be synchronized with the satellite system, may select one or more specific terminals and send an indication message to the selected terminals one to one to indicate sending of a satellite-system-based synchronization signal. For example, the second terminals are selected according to the present position of the first terminal and information of the present position of each of the multiple terminals and the strength of the satellite signal detected by each of the multiple terminals, and the indication information is sent to the selected terminals one to one.

In the embodiment of the present disclosure, the network equipment may also send the broadcast message to indicate the second terminal to send the satellite-system-based synchronization signal.

For example, a terminal which detects a satellite signal having a strength higher than the predetermined strength in a second region is indicated through a broadcast channel to send a satellite-system-based synchronization signal. Here, a distance between a position in the second region and the present position of the terminal is shorter than or equal to the predetermined distance.

For example, if the network equipment may not receive a second message sent by a terminal in the connected state, a terminal which detects a satellite signal having a strength higher than the predetermined strength and which is in the idle state in the second region is indicated through the broadcast channel to send a satellite-system-based synchronization signal.

It is to be understood that the first region and the second region may be completely overlapped regions, partially overlapped regions or completely non-overlapped regions.

In 130, the second terminal sends the satellite-system-based synchronization signal according to an indication of the network equipment.

Optionally, the synchronization signal indicates that the second terminal is directly synchronized with the satellite system or indirectly synchronized with the satellite system.

Or, the method further includes that: the second terminal sends a synchronization broadcast channel. The synchronization broadcast channel indicates that the second terminal is directly synchronized with the satellite system or indirectly synchronized with the satellite system.

Specifically, there are three new synchronization signals (three different sequences) defined in the present disclosure to indicate the following three conditions respectively: 1, direct synchronization with a GNSS; 2, indirect synchronization with the GNSS; and 3, a synchronization signal generated by equipment. There are also defined two synchronization signals: 1, synchronization with the GNSS; and 2, the synchronization signal generated by the equipment. Then, direct synchronization with the GNSS or indirect synchronization with the GNSS is further indicated in the synchronization broadcast channel.

In 140, the first terminal receives the satellite-system-based synchronization signal sent by the second terminal.

In 150, the first terminal is synchronized with the satellite system according to the satellite-system-based synchronization signal sent by the second terminal.

Therefore, in the embodiment of the present disclosure, when the first terminal is not able to be synchronized with the satellite system, the network equipment may indicate the second terminal to send a satellite-system-based synchronization message configured to synchronize the first terminal and the satellite system, so that synchronization between the terminal and the satellite system may be ensured in a D2D manner.

Figure 2:
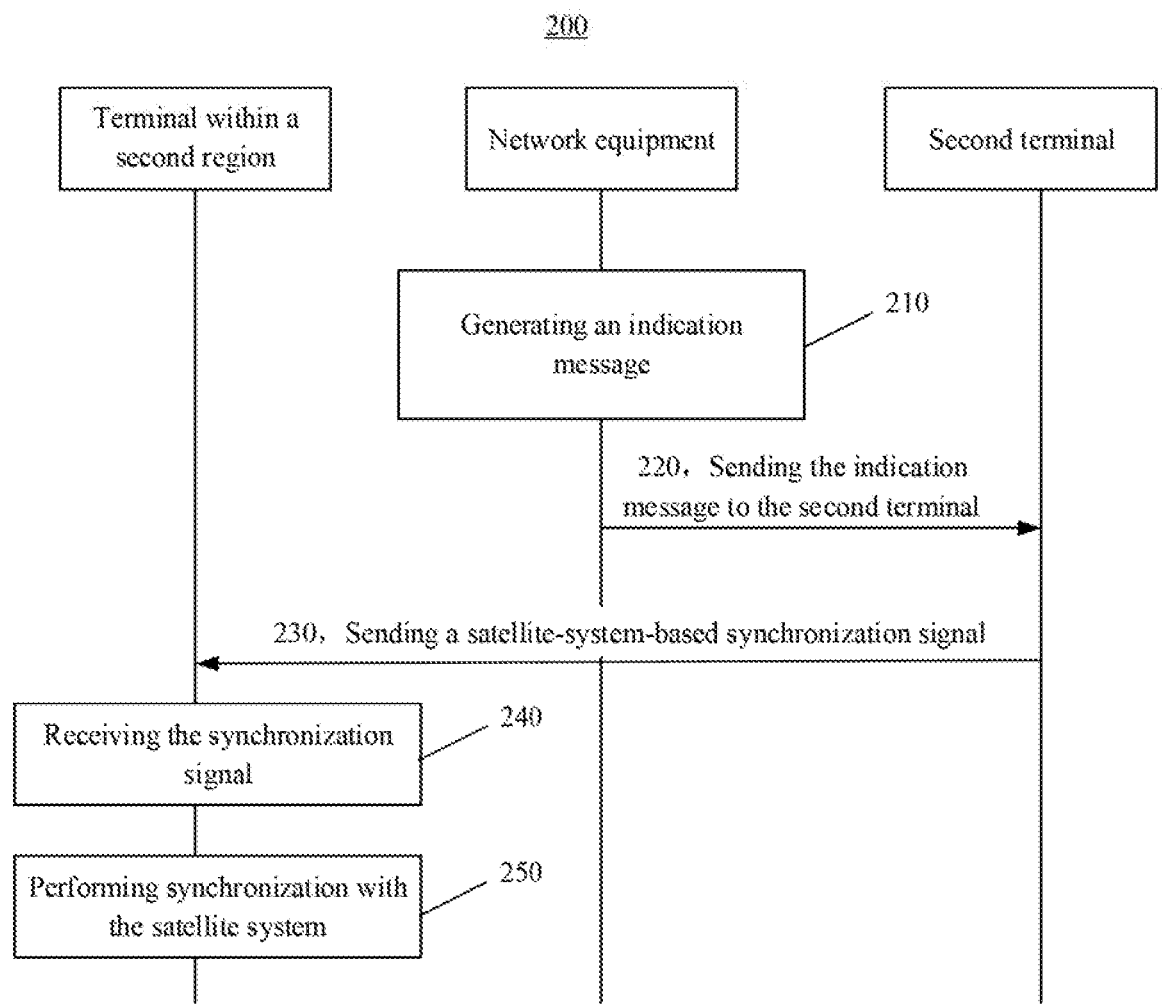
FIG. 2 is a schematic flowchart of a communication method according to an embodiment of the present disclosure.

FIG. 2 is a schematic flowchart of a synchronization method 200 according to an embodiment of the present disclosure. As illustrated in FIG. 2, the method 200 includes 210, 220, 230, 240 and 250.

In 210, network equipment generates an indication message. The indication message indicates a second terminal within a first region to send a satellite-system-based synchronization signal or a terminal to send, once the terminal enters the first region, a satellite-system-based synchronization signal.

Optionally, before generating the indication message, the network equipment determines that satellite signal strength of a second region is equal to or less than a strength threshold. Here, the first region is a neighboring region of the second region, and a distance between a position within the first region and a position within the second region is equal to or shorter than a first predetermined distance. And the first region is determined according to position information of the second region.

Optionally, the network equipment receives a first report message sent by a terminal within the second region. The report message indicates a strength of a satellite signal detected by the terminal. The satellite signal strength of the second region is determined according to the strength of the satellite signal detected by the terminal within the second region.

Optionally, the terminal may regularly send its own present position information and detected satellite signal strength to the network equipment.

Optionally, the terminal may send a second message to the network equipment when determining that its own movement distance exceeds a certain distance (compared with a position where its own present position information and detected satellite signal strength information are reported last time, the movement distance exceeds a certain distance) and a movement velocity exceeds a certain threshold.

Optionally, the terminal may send its own present position and detected satellite signal strength to the network equipment after determining that the detected satellite signal strength is equal to or less than a certain threshold.

Optionally, before receiving the first report message sent by the terminal in the second region, the network equipment may send a broadcast message to the terminal in the second region to indicate the terminal in the second region to report the satellite signal strength.

Optionally, the network equipment may send the broadcast message to terminals in a relatively large region to indicate the terminals in the region to report strength and satellite information, and the network equipment may determine a region of which strength is equal to or less than the strength threshold, i.e., the second region, according to the strength and position information reported by each terminal.

Optionally, the first terminal may refer to all terminals within the first region.

Optionally, the network equipment may determine that the satellite signal strength of the second region is equal to or less than the strength threshold according to a pre-configured satellite signal strength map.

In 220, the network equipment sends the indication message.

Optionally, the indication message is configured to indicate the second terminal to send the satellite-system-based synchronization signal when entering the first region.

Optionally, before the network equipment generates the indication message, the network equipment sends a first broadcast message to terminals within the first region. The first broadcast message indicates each of the terminals within the first region to report information of a satellite signal detected by the terminal. The network equipment receives a second report message sent by each of the terminals within the first region. The second report messages indicates the detected satellite signal strength information of the senders. And the network equipment selects the second terminal from terminals within the first region according to the detected satellite signal strength information of the terminals within the first region, and sends the indication message to the second terminal to indicate the second terminal to send the satellite-system-based synchronization signal. Here, the indication message may be a one-to-one message from the network equipment to the terminal.

Optionally, here, the second terminal in the first region is a terminal which detects a satellite signal having a strength higher than a predetermined strength; and the network equipment sends the indication message through a broadcast channel to indicate the terminal which is located within the first region and which detects a satellite signal having a strength higher than the predetermined strength to send the satellite-system-based synchronization signal.

In 230, the second terminal sends the satellite-system-based synchronization signal according to the indication message.

If the indication message indicates the second terminal to send the satellite-system-based synchronization signal when entering the first region, the second terminal may send the satellite-system-based synchronization signal when determining to enter the first region.

Optionally, the synchronization signal indicates that the second terminal is directly synchronized with the satellite system or indirectly synchronized with the satellite system; or the method further includes that: the second terminal sends a synchronization broadcast channel. The synchronization broadcast channel indicates that the second terminal is directly synchronized with the satellite system or indirectly synchronized with the satellite system.

Specifically, there are three new synchronization signals (three different sequences) defined in the present disclosure to indicate the following three conditions respectively: 1, direct synchronization with a GNSS; 2, indirect synchronization with the GNSS; and 3, a synchronization signal generated by equipment. There are also defined two synchronization signals: 1, synchronization with the GNSS; and 2, the synchronization signal generated by the equipment. Then, direct synchronization with the GNSS or indirect synchronization with the GNSS is further indicated in the synchronization broadcast channel.

In 240, a terminal in a second region receives the satellite-system-based synchronization signal.

In 250, the terminal in the second region performs synchronization according to the satellite-system-based synchronization signal.

Therefore, in the embodiment of the present disclosure, the network equipment may indicate the terminal in the first region or entering the first region to send the satellite-system-based synchronization signal, so that synchronization between a terminal in a neighboring region of the first region and the satellite system may be ensured.

Figure 3:
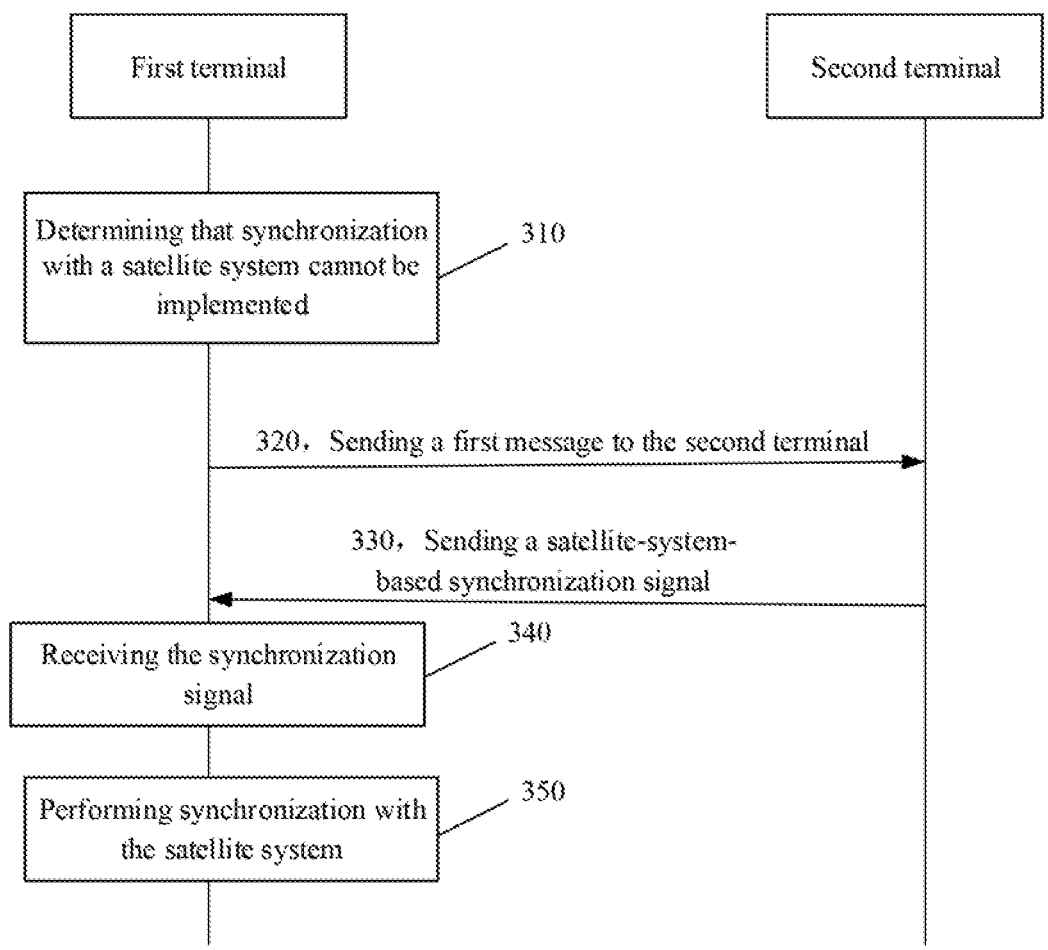
FIG. 3 is a schematic flowchart of a communication method according to an embodiment of the present disclosure.

FIG. 3 is a schematic flowchart of a synchronization method 300 according to an embodiment of the present disclosure. As illustrated in FIG. 3, the method includes 310, 320, 330, 340 and 350.

In 310, it is determined that a first terminal is not able to be synchronized with a satellite system.

Optionally, it is determined that the first terminal is not able to be synchronized with the satellite system under conditions that:

a strength of a satellite signal detected by the first terminal within a first predetermined time period is equal to or less than a first strength threshold; or the strength of the satellite signal detected by the first terminal within the first predetermined time period is equal to or less than the first strength threshold and strength of a satellite-system-based synchronization signal detected by the first terminal within a second predetermined time period and sent by a terminal directly synchronized with the satellite system is equal to or less than a second strength threshold; or the strength of the satellite signal detected by the first terminal within the first predetermined time period is equal to or less than the first strength threshold, the strength of the satellite-system-based synchronization signal detected by the first terminal within the second predetermined time period and sent by the terminal directly synchronized with the satellite system is equal to or less than the second strength threshold and strength of a satellite-system-based synchronization signal detected by the first terminal within a third predetermined time period and sent by a terminal indirectly synchronized with the satellite system is equal to or less than a third strength threshold.

It is to be understood that the first predetermined time period, the second predetermined time period and the third predetermined time period may be time periods with the same length; or the first predetermined time period, the second predetermined time period and the third predetermined time period are time periods with the same length as well as the same starting point and ending point; or the first predetermined time period is after the second predetermined time period, the second predetermined time period is after the third predetermined time period, the first predetermined time period is connected with the second predetermined time period, and the second predetermined time period is connected with the third predetermined time period.

It is also to be understood that the first strength threshold, the second strength threshold and the third strength threshold may be determined according to a practical condition. For example, the first strength threshold, the second strength threshold and the third strength threshold may directly be set to be 0.

In 320, the first terminal sends a first message. The first message indicates that the first terminal is not able to be synchronized with the satellite system. It is to be understood that the first message may also be called an assistance request message.

Optionally, the first terminal may broadcast the first terminal to a terminal.

Optionally, the first message may be a synchronization signal generated by the first terminal.

In 330, the second terminal sends the satellite-system-based synchronization signal according to the first message sent by the first terminal.

Optionally, when satellite signal strength detected by the second terminal is higher than a strength threshold, the second terminal sends the satellite-system-based synchronization signal.

Optionally, for satellite synchronization, the priorities may be defined as:

a satellite signal 1>a synchronization signal 2 from a terminal directly synchronized with the satellite system>a synchronization signal 3 from a terminal indirectly synchronized with the satellite system>a synchronization signal 4 generated by a terminal.

Specifically, in case of no coverage of a cellular network, when the first terminal may not detect any satellite signal and also may not detect the synchronization signal 2 and the synchronization signal 3, the terminal may send the synchronization signal 4 at this moment. The second terminal is directly synchronized with the satellite system, and when the second terminal detects the synchronization signal 4 sent by the first terminal, the second terminal sends the synchronization signal 2; and when the second terminal is synchronized with the satellite system through the synchronization signal 2 or 3 and the second terminal detects the synchronization signal 4 sent by the first terminal, the second terminal sends the synchronization signal 3.

Optionally, the synchronization signal indicates that the second terminal is directly synchronized with the satellite system or indirectly synchronized with the satellite system.

Or, the method further includes that: the second terminal sends a synchronization broadcast channel. The synchronization broadcast channel indicates that the second terminal is directly synchronized with the satellite system or indirectly synchronized with the satellite system.

In 340, the first terminal receives the satellite-system-based synchronization signal sent by the second terminal.

In 350, the first terminal is synchronized with the satellite system according to the synchronization signal.

Therefore, in the embodiment of the present disclosure, when it is determined that first terminal equipment may not be synchronized with the satellite system, the second terminal may be requested to send a satellite-system-based synchronization message configured to synchronize the second terminal and the satellite system, so that synchronization between the terminal and the satellite system may be ensured in a D2D manner.

Figure 4:
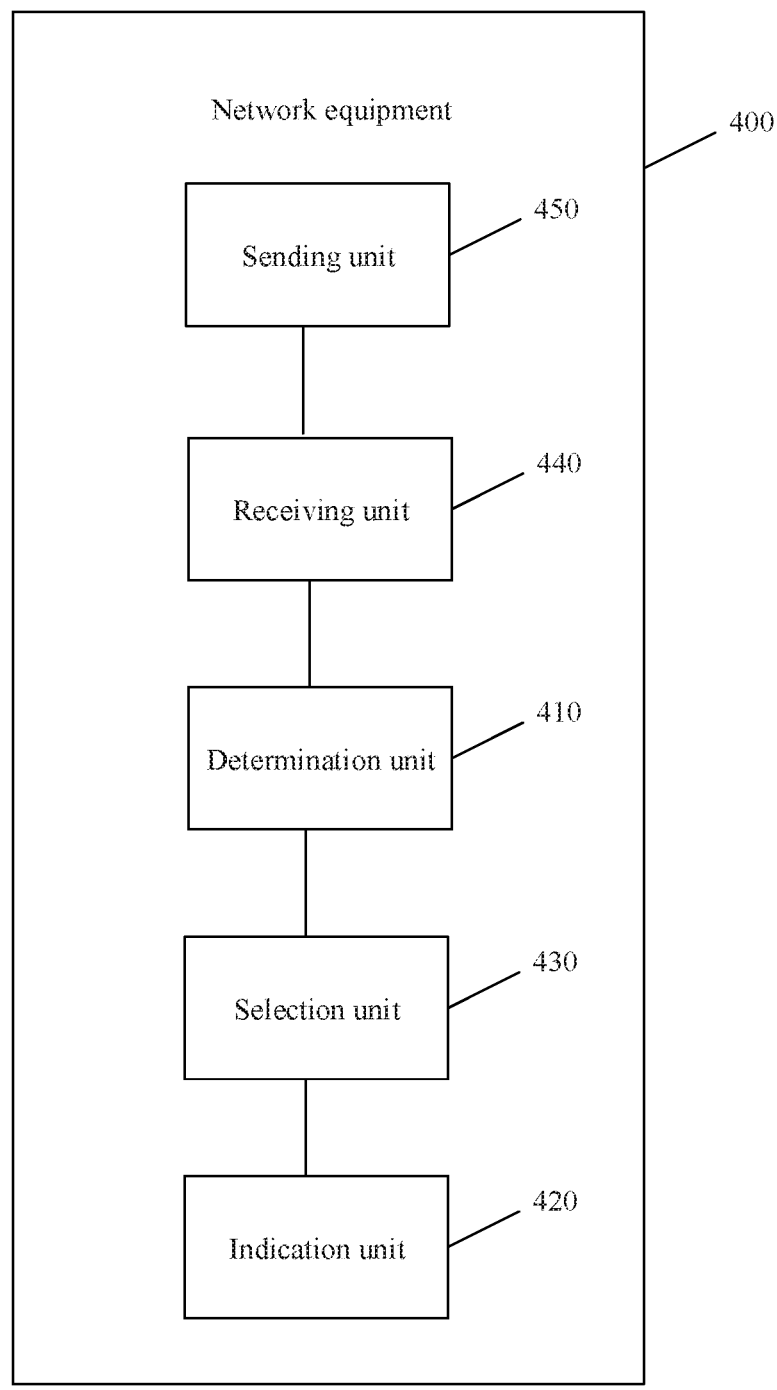
FIG. 4 is a schematic block diagram of a network equipment according to an embodiment of the present disclosure.

FIG. 4 is a schematic block diagram of a network equipment 400 according to an embodiment of the present disclosure. As illustrated in FIG. 4, the network equipment 400 includes a determination unit 410 and an indication unit 420.

The determination unit 410 is configured to determine that a first terminal is not able to be synchronized with a satellite system.

The indication unit 420 is configured to indicate a second terminal to send a satellite-system-based synchronization signal by which the first terminal is synchronized with the satellite system.

Optionally, as illustrated in FIG. 4, the network equipment 400 further includes a selection unit 430, configured to determine a present position of the first terminal; and select the second terminal according to the present position of the first terminal.

Optionally, as illustrated in FIG. 4, the network equipment further includes a receiving unit 440, configured to receive a first message sent by the first terminal. The first message indicates that the first terminal is not able to be synchronized with the satellite system and the first message includes information from which a present position of the first terminal is acquired.

The determination unit 410 is configured to determine that the first terminal is not able to be synchronized with the satellite system according to the first message.

The selection unit 430 is configured to determine the present position of the first terminal according to the first message.

Optionally, as illustrated in FIG. 4, the network equipment further includes a receiving unit 440, configured to receive a report message sent by the second terminal or a third terminal. The report message indicates that the first terminal is not able to be synchronized with the satellite system and includes the information from which the present position of the first terminal is acquired.

The determination unit 410 is configured to determine that the first terminal is not able to be synchronized with the satellite system according to the report message.

The selection unit 430 is configured to determine the present position of the first terminal according to the report message.

Optionally, the report message further includes information of a present position of a terminal which send a second message and information of a strength of a satellite signal detected by the terminal.

Optionally, the information from which the present position of the first terminal is acquired includes position information of the first terminal which is acquired by the first terminal from the satellite system at a first time and velocity information representing velocity of the first terminal from the first time to a time when the first message is reported.

Optionally, as illustrated in FIG. 4, the network equipment 400 further includes a receiving unit 440, configured to receive the second message sent by each of multiple terminals. The second message indicates the information of a present position of the terminal and information of a strength of a satellite signal detected by the terminal.

The selection unit 430 is configured to select the second terminal according to the present position of the first terminal and information of the present position of each of the multiple terminals and the strength of the satellite signal detected by each of the multiple terminals.

Optionally, as illustrated in FIG. 4, the network equipment 400 further includes a sending unit 450, configured to send a broadcast message to terminals within a first region. The broadcast message indicates each of the terminals within the first region to report information of a present position of the terminal and information of a strength of a satellite signal detected by the terminal. Here, a distance between a position within the first region and the present position of the first terminal is equal to or shorter than a first predetermined distance.

Optionally, the receiving unit 440 is further configured to receive the second message regularly sent by each of the multiple terminals.

Optionally, the indication unit 420 is further configured to indicate the second terminal through a broadcast channel to send the satellite-system-based synchronization signal. Here, the second terminal is a terminal which is located within a second region and which detects a satellite signal having strength equal to or greater than a strength threshold, and a distance between a position within the second region and the present position of the terminal is equal to or shorter than a second predetermined distance.

It is to be understood that the network equipment 400 may correspond to a network equipment in the method 100 illustrated in FIG. 1, may realize corresponding functions of the network equipment in the method 100 and will not be elaborated herein for simplicity.

Figure 5:
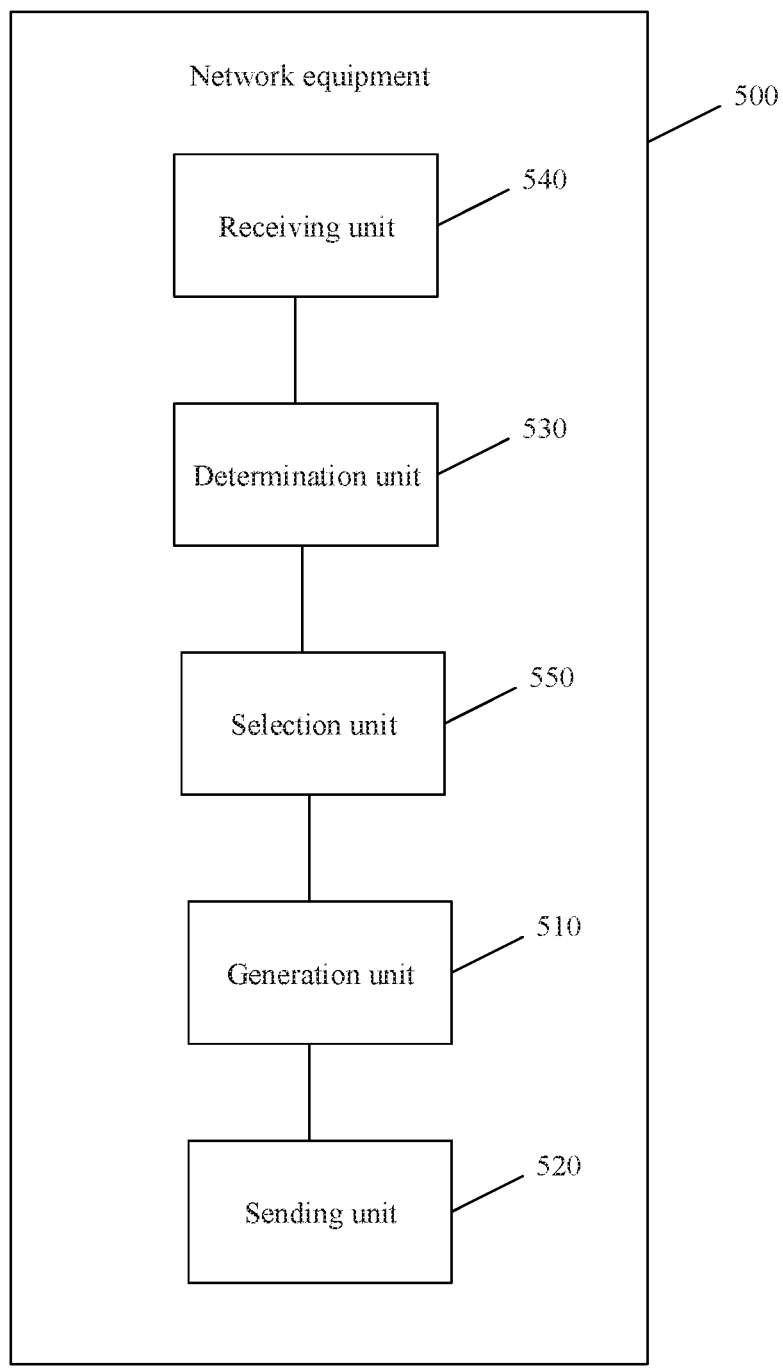
FIG. 5 is a schematic block diagram of a network equipment according to an embodiment of the present disclosure.

FIG. 5 is a schematic block diagram of a network equipment 500 according to an embodiment of the present disclosure. As illustrated in FIG. 5, the network equipment 500 includes a generation unit 510 and a sending unit 520.

The generation unit 510 is configured to generate an indication message. The indication message indicates a second terminal within a first region to send a satellite-system-based synchronization signal or a terminal to send, once the terminal enters the first region, a satellite-system-based synchronization signal.

The sending unit 520 is configured to send the indication message.

Optionally, as illustrated in FIG. 5, the network equipment 500 further includes a determination unit 530.

The determination unit 530 is configured to determine that satellite signal strength of a second region is equal to or less than a strength threshold. Here, the first region is a neighboring region of the second region, and a distance between a position within the first region and a position within the second region is equal to or shorter than a first predetermined distance.

The determination unit 530 is further configured to determine the first region according to position information of the second region.

Optionally, as illustrated in FIG. 5, the network equipment 500 further includes a receiving unit 540, configured to receive a first report message sent by a terminal within the second region. The report message indicates a strength of a satellite signal detected by the terminal.

Here, the determination unit 530 is further configured to determine the satellite signal strength of the second region according to the strength of the satellite signal detected by the terminal within the second region.

Optionally, as illustrated in FIG. 5, the network equipment further includes a receiving unit 540 and a selection unit 550.

The sending unit 520 is further configured to send a first broadcast message to terminals within the first region. The first broadcast message indicates each of the terminals within the first region to report information of a satellite signal detected by the terminal.

The receiving unit 540 is further configured to receive a second report message sent by each of the terminals within the first region. The second report message indicates the information of the strength the satellite signal detected by the terminal.

The selection unit 550 is further configured to select the first terminal from the terminals within the first region according to the information of the strength of the satellite signal detected by the terminals within the first region.

Optionally, the first terminal in the first region is a terminal which detects a satellite signal having a strength higher than a predetermined strength.

The sending unit 520 is further configured to send the indication message through a broadcast channel to indicate the terminal which is located within the first region and which detects a satellite signal having a strength higher than the predetermined strength to send the satellite-system-based synchronization signal.

It is to be understood that the network equipment 500 may correspond to a network equipment in the method 200 illustrated in FIG. 2, may realize corresponding functions of the network equipment in the method 20X) and will not be elaborated herein for simplicity.

Figure 6:
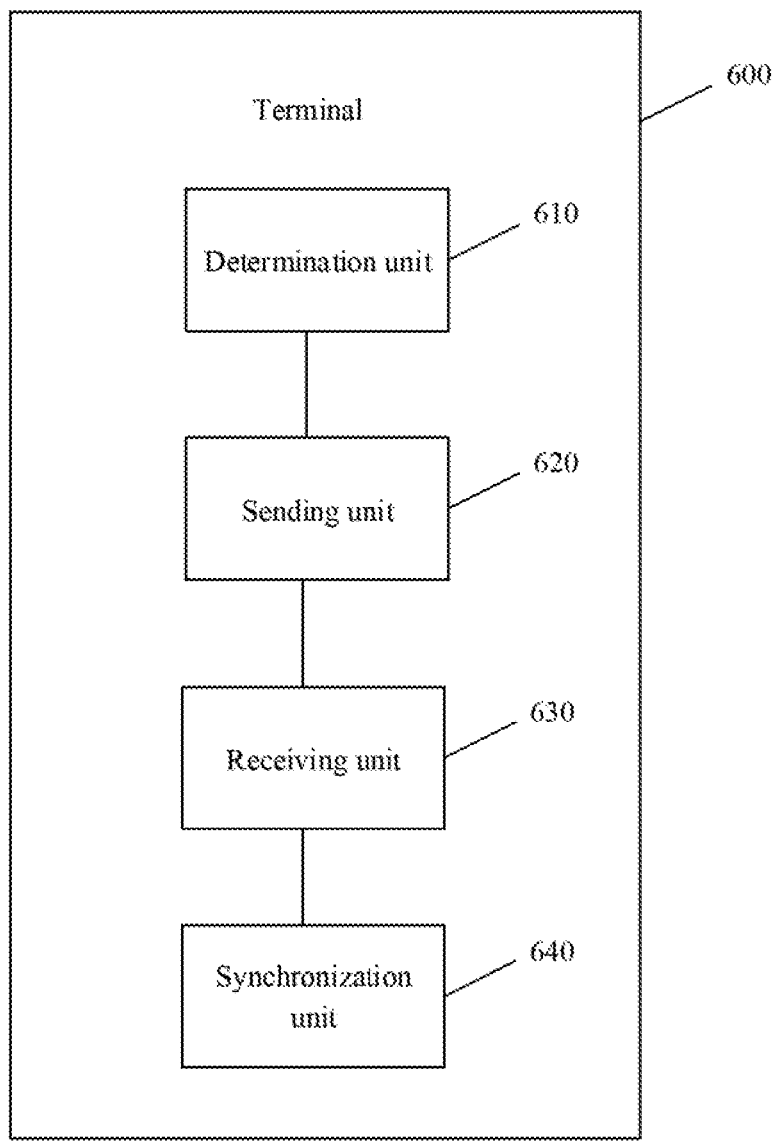
FIG. 6 is a schematic block diagram of a terminal equipment according to an embodiment of the present disclosure.

FIG. 6 is a schematic block diagram of a terminal 600 according to an embodiment of the present disclosure. Here, the terminal 600 may be called a first terminal. The terminal 600 includes a determination unit 610, a sending unit 620, a receiving unit 630 and a synchronization unit 640.

The determination unit 610 is configured to determine that the first terminal is not able to be synchronized with a satellite system.

The sending unit 620 is configured to send a first message. The first message indicates that the first terminal is not able to be synchronized with the satellite system.

The receiving unit 630 is configured to receive a satellite-system-based synchronization signal sent by a second terminal.

The synchronization unit 640 is configured to perform synchronization with the satellite system according to the synchronization signal.

Optionally, the first message includes information from which a present position of the first terminal is acquired.

Optionally, the information from which the present position of the first terminal is acquired includes position information of the first terminal which is acquired by the first terminal from the satellite system at a first time and velocity information representing velocity of the first terminal from the first time to a time when the first message is reported.

Optionally, the sending unit 620 is further configured to send the indication message to a network equipment.

Optionally, the sending unit 620 is further configured to broadcast the first message to terminals.

Optionally, the first message is a synchronization signal generated by the first terminal.

Optionally, the determination unit 610 determines that the first terminal is not able to be synchronized with the satellite system under conditions that:
  a strength of a satellite signal detected by the first terminal within a first predetermined time period is equal to or less than a first strength threshold; or
  the strength of the satellite signal detected by the first terminal within the first predetermined time period is equal to or less than the first strength threshold and strength of a satellite-system-based synchronization signal detected by the first terminal within a second predetermined time period and sent by a terminal directly synchronized with the satellite system is equal to or less than a second strength threshold; or
  the strength of the satellite signal detected by the first terminal within the first predetermined time period is equal to or less than the first strength threshold, the strength of the satellite-system-based synchronization signal detected by the first terminal within the second predetermined time period and sent by the terminal directly synchronized with the satellite system is equal to or less than the second strength threshold and strength of a satellite-system-based synchronization signal detected by the first terminal within a third predetermined time period and sent by a terminal indirectly synchronized with the satellite system is equal to or less than a third strength threshold.

It is to be understood that the terminal 600 may correspond to a first terminal in FIG. 1 or a first terminal in FIG. 3, may realize corresponding functions of the first terminal in FIG. 1 or the first terminal in FIG. 3 and will not be elaborated herein for simplicity.

Figure 7:
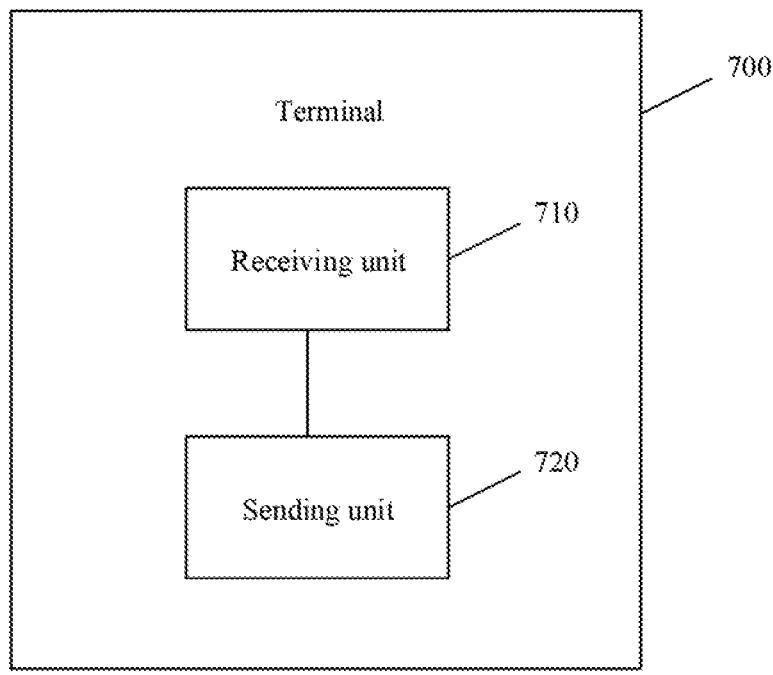
FIG. 7 is a schematic block diagram of a terminal equipment according to an embodiment of the present disclosure.

FIG. 7 is a schematic block diagram of a terminal 700 according to an embodiment of the present disclosure. The terminal 700 may be called a second terminal. The terminal 700 includes a receiving unit 710 and a sending unit 720.

The receiving unit 710 is configured to receive an indication message. The indication message indicates the second terminal to send a satellite-system-based synchronization signal.

The sending unit 720 is configured to send the satellite-system-based synchronization signal according to the indication message such that a first terminal is synchronized with a satellite system through the synchronization signal.

Optionally, the receiving unit 710 is further configured to receive the indication message sent by the first terminal.

Optionally, the sending unit 720 is further configured to when satellite signal strength detected by the second terminal is more than or equal to a strength threshold, send the satellite-system-based synchronization signal.

Optionally, the receiving unit 710 is further configured to receive the indication message sent by a network equipment.

Optionally, the sending unit 720 is further configured to report information of a present position of the second terminal and information of a satellite signal detected by the second terminal to the network equipment.

Optionally, the receiving unit 710 is further configured to receive a broadcast message sent by the network equipment. The broadcast message is configured to request a terminal having received the broadcast message to report information of a present position of the terminal and information of a strength of a satellite signal detected by the terminal.

Optionally, the receiving unit 710 is further configured to receive an assistance request message sent by the first terminal. The assistance request message indicates that the first terminal is not able to be synchronized with the satellite system and the first message contains information from which a position of the first terminal is acquired.

Here, the sending unit 720 is further configured to report the information of a present position of the second terminal and information of a satellite signal detected by the second terminal to the network equipment according to the assistance request message and send the information from which the position of the first terminal is acquired to the network equipment.

Optionally, the sending unit 720 is further configured to regularly report the information of a present position of the second terminal and information of a satellite signal detected by the second terminal to the network equipment.

Optionally, the sending unit 720 is further configured to when a movement velocity of the second terminal is higher than a predetermined velocity or a movement distance of the second terminal is longer than a predetermined distance, report the information of a present position of the second terminal and information of a satellite signal detected by the second terminal to the network equipment.

Optionally, the synchronization signal indicates that the second terminal is directly synchronized with the satellite system or indirectly synchronized with the satellite system.

Alternatively, the sending unit 720 is further configured to send a synchronization broadcast channel. The synchronization broadcast channel indicates that the second terminal is directly synchronized with the satellite system or indirectly synchronized with the satellite system.

It is to be understood that the terminal 700 may correspond to a second terminal in FIG. 1, FIG. 2 or FIG. 3, may realize corresponding functions of the second terminal in FIG. 1, FIG. 2 or FIG. 3 and will not be elaborated herein for simplicity.

Figure 8:
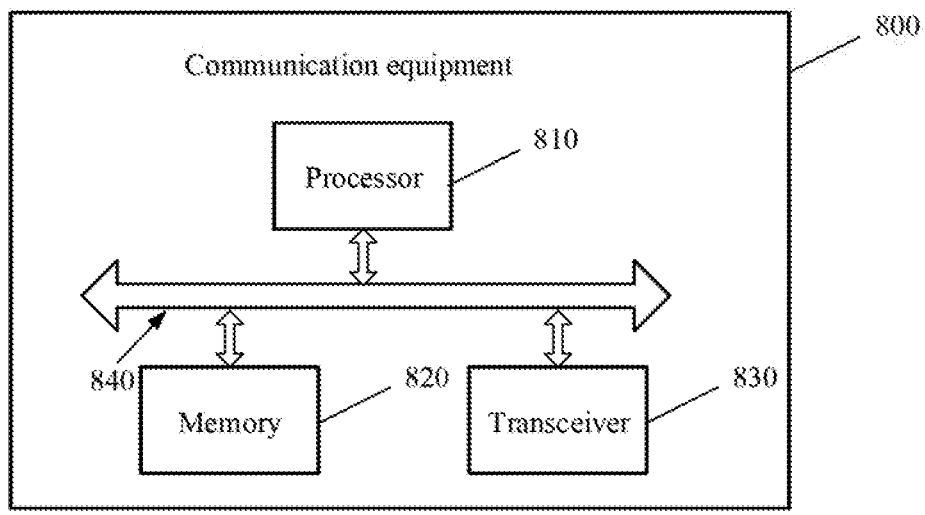
FIG. 8 is a schematic block diagram of a communication equipment according to an embodiment of the present disclosure.

FIG. 8 is a schematic block diagram of a communication equipment 800 according to an embodiment of the present disclosure. As illustrated in FIG. 8, the communication equipment 800 includes a processor 810, a memory 820 and a transceiver 830. Optionally, the communication equipment further includes a bus system 840, and the bus system is configured to interconnect the processor 810, the memory 820 and the transceiver 830. The memory 820 is configured to store an instruction, and the processor 810 is configured to call the instruction stored in the memory 820 to execute corresponding operations.

Optionally, the communication equipment 800 illustrated in FIG. 8 may execute corresponding functions of a network equipment in the method embodiments, or may execute corresponding operations of a first terminal mentioned in the method embodiments or may execute corresponding operations of a second terminal mentioned in the method embodiments.

For convenient understanding, descriptions will be made below with the corresponding operations of the network equipment mentioned in the method embodiment 100 as an example.

The processor 810 calls the instruction stored in the memory 820 to execute the following operations:

determining that a first terminal is not able to be synchronized with a satellite system; and indicating a second terminal through the transceiver 830 to send a satellite-system-based synchronization signal by which the first terminal is synchronized with the satellite system.

Optionally, the processor 810 calls the instruction stored in the memory 820 to execute the following operations:

before the second terminal is indicated through the transceiver 830 to send the satellite-system-based synchronization signal, determining a present position of the first terminal; and selecting the second terminal according to the present position of the first terminal.

Optionally, the processor 810 calls the instruction stored in the memory 820 to execute the following operations: receiving a first message sent by the first terminal through the transceiver 830, the first message indicating that the first terminal is not able to be synchronized with the satellite system and the first message including information configured to acquire the present position of the first terminal; determining that the first terminal is not able to be synchronized with the satellite system according to the first message; and determining the present position of the first terminal according to the first message.

Optionally, the processor 810 calls the instruction stored in the memory 820 to execute the following operations:

receiving a report message sent by the second terminal or a third terminal through the transceiver 830, the report message indicating that the first terminal is not able to be synchronized with the satellite system and including the information from which the present position of the first terminal is acquired; determining that the first terminal is not able to be synchronized with the satellite system according to the report message; and determining the present position of the first terminal according to the report message.

Optionally, the report message further includes information of a present position of a terminal which send a second message and information of a strength of a satellite signal detected by the terminal.

Optionally, the information from which the present position of the first terminal is acquired includes position information of the first terminal which is acquired by the first terminal from the satellite system at a first time and velocity information representing velocity of the first terminal from the first time to a time when the first message is reported.

Optionally, the processor 810 calls the instruction stored in the memory 820 to execute the following operations:

before the second terminal is selected according to the present position of the first terminal, receiving the second message sent by each of multiple terminals, the second message indicating information of a present position of the terminal and information of a strength of a satellite signal detected by the terminal; and selecting the second terminal according to the present position of the first terminal and information of the present position of each of the multiple terminals and the strength of the satellite signal detected by each of the multiple terminals.

Optionally, the processor 810 calls the instruction stored in the memory 820 to execute the following operations:

before the second message sent by each of the multiple terminals is received through the transceiver 830, sending a broadcast message to terminals within a first region through the transceiver 830, the broadcast message indicating each of the terminals within the first region to report information of a present position of the terminal and information of a strength of a satellite signal detected by the terminal. Here, a distance between a position within the first region and the present position of the first terminal is equal to or shorter than a first predetermined distance.

Optionally, the processor 810 calls the instruction stored in the memory 820 to execute the following operations:

receiving the second message regularly sent by each of the multiple terminals through the transceiver 830.

Optionally, the processor 810 calls the instruction stored in the memory 820 to execute the following operations:

indicating the second terminal through a broadcast channel to send the satellite-system-based synchronization signal through the transceiver 830. Here, the second terminal is a terminal which is located within a second region and which detects a satellite signal having strength equal to or greater than a strength threshold. And a distance between a position within the second region and the present position of the terminal is equal to or shorter than a second predetermined distance.

Descriptions will be made below with the corresponding operations of the network equipment mentioned in the method embodiment 200 as an example.

The processor 810 calls the instruction stored in the memory 820 to execute the following operations:

generating an indication message, the indication message indicating a second terminal within a first region to send a satellite-system-based synchronization signal or a terminal to send, once the terminal enters the first region, a satellite-system-based synchronization signal; and sending the indication message through the transceiver 830.

Optionally, the processor 810 calls the instruction stored in the memory 820 to execute the following operations:

before the indication message is generated, determining that satellite signal strength of a second region is equal to or less than a strength threshold and determining the first region according to position information of the second region. Here, the first region is a neighboring region of the second region, and a distance between a position within the first region and a position within the second region is equal to or shorter than a first predetermined distance.

Optionally, the processor 810 calls the instruction stored in the memory 820 to execute the following operations:

receiving a first report message sent by a terminal within the second region through the transceiver 830, the report message indicating a strength of a satellite signal detected by the terminal; and determining the satellite signal strength of the second region according to the strength of the satellite signal detected by the terminal within the second region.

Optionally, the processor 810 calls the instruction stored in the memory 820 to execute the following operations:

before the indication message is sent, sending a first broadcast message to terminals within the first region through the transceiver 830, the first broadcast message indicating each of the terminals within the first region to report information of a satellite signal detected by the terminal;

receiving a second report message sent by each of the terminals within the first region through the transceiver 830, the second report message indicating the information of the strength the satellite signal detected by the terminal; and selecting the second terminal from the terminals within the first region according to the information of the strength of the satellite signal detected by the terminals within the first region.

Optionally, the second terminal in the first region is a terminal which detects a satellite signal having a strength higher than a predetermined strength; and The processor 810 calls the instruction stored in the memory 820 to execute the following operation:

sending the indication message through a broadcast channel by use of the transceiver 830 to indicate the terminal which is located within the first region and which detects a satellite signal having a strength higher than the predetermined strength to send the satellite-system-based synchronization signal.

Descriptions will be made below with the corresponding operations of the first terminal mentioned in the method embodiment 100 or 300 as an example.

The processor 810 calls the instruction stored in the memory 820 to execute the following operations:

determining that synchronization with a satellite system may not be implemented; and sending a first message through the transceiver 830, the first message indicating that the first terminal is not able to be synchronized with the satellite system;

receiving a satellite-system-based synchronization signal sent by a second terminal through the transceiver 830; and performing synchronization with the satellite system according to the synchronization signal.

Optionally, the first message includes information from which a present position of the first terminal is acquired.

Optionally, the information from which the present position of the first terminal is acquired includes position information of the first terminal which is acquired by the first terminal from the satellite system at a first time and velocity information representing velocity of the first terminal from the first time to a time when the first message is reported.

Optionally, the processor 810 calls the instruction stored in the memory 820 to execute the following operation:

sending the first message to a network equipment through the transceiver 830.

The processor 810 calls the instruction stored in the memory 820 to execute the following operation:

broadcasting the first message to terminals through the transceiver 830.

Optionally, the first message is a synchronization signal generated by the first terminal.

Optionally, it is determined that synchronization with the satellite system may not be implemented under conditions that:

a strength of a satellite signal detected by the first terminal within a first predetermined time period is equal to or less than a first strength threshold; or the strength of the satellite signal detected by the first terminal within the first predetermined time period is equal to or less than the first strength threshold and strength of a satellite-system-based synchronization signal detected by the first terminal within a second predetermined time period and sent by a terminal directly synchronized with the satellite system is equal to or less than a second strength threshold; or the strength of the satellite signal detected by the first terminal within the first predetermined time period is equal to or less than the first strength threshold, the strength of the satellite-system-based synchronization signal detected by the first terminal within the second predetermined time period and sent by the terminal directly synchronized with the satellite system is equal to or less than the second strength threshold and strength of a satellite-system-based synchronization signal detected by the first terminal within a third predetermined time period and sent by a terminal indirectly synchronized with the satellite system is equal to or less than a third strength threshold.

Descriptions will be made below with the corresponding operations of the second terminal mentioned in the method embodiment 100, 200 or 300 as an example.

The processor 810 calls the instruction stored in the memory 820 to execute the following operations:

receiving an indication message through the transceiver 830, the indication message indicating the second terminal to send a satellite-system-based synchronization signal; and sending the satellite-system-based synchronization signal through the transceiver 830 according to the indication message such that a first terminal is synchronized with a satellite system through the synchronization signal.

Optionally, the processor 810 calls the instruction stored in the memory 820 to execute the following operation:

receiving the indication message sent by the first terminal through the transceiver 830.

Optionally, the processor 810 calls the instruction stored in the memory 820 to execute the following operation:

when satellite signal strength detected by the second terminal is more than or equal to a strength threshold, sending the satellite-system-based synchronization signal through the transceiver 830.

Optionally, the processor 810 calls the instruction stored in the memory 820 to execute the following operation:

receiving the indication message sent by a network equipment through the transceiver 830.

Optionally, the processor 810 calls the instruction stored in the memory 820 to execute the following operation:

reporting information of a present position of the second terminal and information of a satellite signal detected by the second terminal to the network equipment through the transceiver 830.

Optionally, the processor 810 calls the instruction stored in the memory 820 to execute the following operation:

receiving a broadcast message sent by the network equipment through the transceiver 830, the broadcast message being configured to request a terminal having received the broadcast message to report information of a present position of the terminal and information of a strength of a satellite signal detected by the terminal.

Optionally, the processor 810 calls the instruction stored in the memory 820 to execute the following operations:

receiving an assistance request message sent by the first terminal through the transceiver 830, the assistance request message indicating that the first terminal is not able to be synchronized with the satellite system and the first message containing information from which a position of the first terminal is acquired;

reporting the information of a present position of the second terminal and information of a satellite signal detected by the second terminal to the network equipment through the transceiver 830 according to the assistance request message; and sending the information from which the position of the first terminal is acquired to the network equipment through the transceiver 830.

Optionally, the processor 810 calls the instruction stored in the memory 820 to execute the following operation:

regularly reporting the information of a present position of the second terminal and information of a satellite signal detected by the second terminal to the network equipment through the transceiver 830.

Optionally, the processor 810 calls the instruction stored in the memory 820 to execute the following operation:

when a movement velocity of the second terminal is higher than a predetermined velocity or a movement distance of the second terminal is longer than a predetermined distance, reporting the information of a present position of the second terminal and information of a satellite signal detected by the second terminal to the network equipment through the transceiver 830.

Optionally, the synchronization signal indicates that the second terminal is directly synchronized with the satellite system or indirectly synchronized with the satellite system.

Optionally, the processor 810 calls the instruction stored in the memory 820 to execute the following operation:

sending a synchronization broadcast channel through the transceiver 830, the synchronization broadcast channel indicating that the second terminal is directly synchronized with the satellite system or indirectly synchronized with the satellite system.

Those of ordinary skill in the art may realize that the units and algorithm operations of each example described in combination with the embodiments disclosed in the invention may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the related art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the present disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for synchronization, comprising:
   determining, by a network equipment, that a first terminal is not able to be synchronized with a satellite system; and
   determining, by the network equipment, a present position of the first terminal; and
   selecting, by the network equipment, a second terminal according to the present position of the first terminal;
   indicating, by the network equipment, the second terminal to send a satellite-system-based synchronization signal by which the first terminal is synchronized with the satellite system;
   wherein determining, by the network equipment, that the first terminal is not able to be synchronized with the satellite system comprises:
   receiving, by the network equipment, a first message sent by the first terminal, the first message indicating that the first terminal is not able to be synchronized with the satellite system; and
   determining, by the network equipment, that the first terminal is not able to be synchronized with the satellite system according to the first message;
   wherein indicating, by the network equipment, the second terminal to send the satellite-system-based synchronization signal comprises;
   indicating the second terminal through a broadcast channel to send the satellite-system-based synchronization signal, wherein the second terminal is a terminal which is located within a second region and which detects satellite signal having strength equal to or greater than a strength threshold, and a distance between a position within the second region and the present position of the first terminal is equal to or shorter than a second predetermined distance.

2. The method of claim 1, wherein the first message comprises information from which the present position of the first terminal is acquired,
   wherein determining, by the network equipment, the present position of the first terminal comprises: determining the present position of the first terminal according to the first message.

3. The method of claim 2, wherein the information from which the present position of the first terminal is acquired comprises position information of the first terminal which is acquired by the first terminal from the satellite system at a first time and velocity information representing velocity of the first terminal from the first time to a time when the first message is reported.

4. The method of claim 1, before selecting, by the network equipment, the second terminal according to the present position of the first terminal, further comprising:
   receiving, by the network equipment, a second message sent by each of a plurality of terminals, the second message indicating information of a present position of the terminal and information of a strength of a satellite signal detected by the terminal, wherein
   selecting, by the network equipment, the second terminal according to the present position of the first terminal comprises:
   selecting the second terminal according to the present position of the first terminal and information of the present position of each of the plurality of terminals and the strength of the satellite signal detected by each of the plurality of terminals,
   wherein before receiving, by the network equipment, the second message sent by each of the plurality of terminals, the method further comprises: sending, by the network equipment, a broadcast message to terminals within a first region, the broadcast message indicating each of the terminals within the first region to report information of a present position of the terminal and information of a strength of a satellite signal detected by the terminal, wherein a distance between a position within the first region and the present position of the first terminal is equal to or shorter than a first predetermined distance.

5. The method of claim 4, wherein receiving, by the network equipment, the second message sent by each of the plurality of terminals comprises:
   receiving the second message regularly sent by each of the plurality of terminals.

6. A method for synchronization, comprising:
   generating, by a network equipment, an indication message, the indication message indicating a second terminal within a first region to send a satellite-system-based synchronization signal; and
   sending, by the network equipment, the indication message;
   wherein before generating, by the network equipment, the indication message, the method further comprises:
   determining, by the network equipment, that satellite signal strength of a second region is equal to or less than a strength threshold, wherein the first region is a neighboring region of the second region, and a distance between a position within the first region and a position within the second region is equal to or shorter than a first predetermined distance;
   determining the first region according to position information of the second region;
   sending, by the network equipment, a first broadcast message to terminals within the first region, the first broadcast message indicating each of the terminals within the first region to report information of a strength of a satellite signal detected by the terminal;
   receiving, by the network equipment, a second report message sent by each of the terminals within the first region, the second report message indicating the information of the strength of the satellite signal detected by the terminal; and
   selecting, by the network equipment, the second terminal from the terminals within the first region according to the information of the strength of the satellite signal detected by the terminals within the first region.

7. The method of claim 6,
   wherein the method further comprises:
   receiving, by the network equipment, a first report message sent by a terminal within the second region, the report message indicating a strength of a satellite signal detected by the terminal; and determining the satellite signal strength of the second region according to the strength of the satellite signal detected by the terminal within the second region.

8. The method of claim 6, wherein the second terminal in the first region is a terminal which detects a satellite signal having a strength higher than a predetermined strength; and
sending, by the network equipment, the indication message comprises:
sending, by the network equipment, the indication message through a broadcast channel to indicate the terminal which is located within the first region and which detects a satellite signal having a strength higher than the predetermined strength to send the satellite-system-based synchronization signal.

9. A method for synchronization, comprising:
receiving, by a second terminal, an indication message sent by a network equipment, the indication message indicating the second terminal to send a satellite-system-based synchronization signal, wherein the second terminal is selected by the network equipment according to a present position of a first terminal, the second terminal is a terminal which is located within a second region and which detects a satellite signal having strength equal to or greater than a strength threshold, and a distance between a position within the second region and the present position of the first terminal is equal to or shorter than a second predetermined distance; and
sending, by the second terminal, the satellite-system-based synchronization signal according to the indication message such that a first terminal is synchronized with a satellite system through the synchronization signal.

10. The method of claim 9, before receiving, by the second terminal, the indication message sent by the network equipment, further comprising:
reporting, by the second terminal, information of a present position of the second terminal and information of a satellite signal detected by the second terminal to the network equipment.

11. The method of claim 10, before reporting, by the second terminal, the information of a present position of the second terminal and information of a satellite signal detected by the second terminal to the network equipment, further comprising:
receiving, by the second terminal, a broadcast message sent by the network equipment, the broadcast message being configured to request a terminal having received the broadcast message to report information of a present position of the terminal and information of a strength of a satellite signal detected by the terminal.

12. The method of claim 10, before reporting, by the second terminal, the information of a present position of the second terminal and information of a satellite signal detected by the second terminal to the network equipment, further comprising:
receiving, by the second terminal, an assistance request message sent by the first terminal, the assistance request message indicating that the first terminal is not able to be synchronized with the satellite system and the first message containing information from which a position of the first terminal is acquired, wherein
reporting, by the second terminal, the information of a present position of the second terminal and information of a satellite signal detected by the second terminal to the network equipment comprises:
reporting, by the second terminal, the information of a present position of the second terminal and information of a satellite signal detected by the second terminal to the network equipment according to the assistance request message, wherein
the method further comprises: sending, by the second terminal, the information from which the position of the first terminal is acquired to the network equipment.

13. The method of claim 10, wherein reporting, by the second terminal, the information of a present position of the second terminal and information of a satellite signal detected by the second terminal to the network equipment comprises:
regularly reporting, by the second terminal, the information of the present position of the second terminal and information of the satellite signal detected by the second terminal to the network equipment; or
responsive to that a movement velocity of the second terminal is higher than a predetermined velocity or that a movement distance of the second terminal is longer than a predetermined distance, reporting, by the second terminal, the information of a present position of the second terminal and information of a satellite signal detected by the second terminal to the network equipment.

14. The method of claim 9, wherein the synchronization signal indicates that the second terminal is directly synchronized with the satellite system or indirectly synchronized with the satellite system; or
the method further comprises: sending, by the second terminal, a synchronization broadcast channel, the synchronization broadcast channel indicating that the second terminal is directly synchronized with the satellite system or indirectly synchronized with the satellite system.

* * * * *